United States Patent [19]
Moffatt et al.

[11] Patent Number: 5,935,309
[45] Date of Patent: Aug. 10, 1999

[54] INK-JET INKS FOR IMPROVED PRINT QUALITY

[75] Inventors: John R. Moffatt; Edward T. Bedford; Hiang P. Lauw, all of Corvallis, Oreg.

[73] Assignee: Hewlett-Packard Company, Palo Alto, Calif.

[21] Appl. No.: 09/063,638

[22] Filed: Apr. 20, 1998

Related U.S. Application Data

[63] Continuation-in-part of application No. 08/742,137, Oct. 31, 1996, Pat. No. 5,785,745.

[51] Int. Cl.$^6$ .................................................... C09D 11/02
[52] U.S. Cl. .................................... 106/31.27; 106/31.43; 106/31.47; 106/31.57; 106/31.58; 106/31.59
[58] Field of Search ............................. 106/31.27, 31.43, 106/31.57, 31.58, 31.59

[56] References Cited

U.S. PATENT DOCUMENTS

| | | | |
|---|---|---|---|
| 4,664,708 | 5/1987 | Allen | 106/31.43 |
| 4,836,851 | 6/1989 | Pawlowski et al. | 106/31.43 |
| 5,102,459 | 4/1992 | Ritter et al. | 106/31.36 |
| 5,116,409 | 5/1992 | Moffatt | 106/31.59 |
| 5,145,518 | 9/1992 | Winnik et al. | 106/31.33 |
| 5,342,439 | 8/1994 | Lauw | 106/31.59 |
| 5,534,052 | 7/1996 | Mennicke et al. | 106/31.43 |
| 5,785,745 | 7/1998 | Lauw et al. | 106/31.59 |
| 5,788,753 | 8/1998 | Pawlowski et al. | 106/31.59 |
| 5,821,283 | 10/1998 | Hesler et al. | 106/31.59 |

Primary Examiner—Helene Klemanski

[57] ABSTRACT

An ink-jet ink composition for ink-jet printing and a method using the same is disclosed, the ink composition comprising an aqueous liquid vehicle, at least one zwitterionic surfactant; and at least one amphiphilic dye, said at least one amphiphilic dye comprising a plurality of amphiphilic dye molecules, each of said amphiphilic dye molecules consisting essentially of a chromophore and at least one hydrophobic arm attached thereto, said at least amphiphilic dye being present in said ink-jet ink composition in an amount that is at least equal to its critical micelle concentration. The ink compositions of the present invention provide enhanced waterfastness and optical density.

20 Claims, 2 Drawing Sheets

INK-JET INKS FOR IMPROVED PRINT QUALITY

CROSS REFERENCE TO RELATED APPLICATIONS

The present application is a continuation in part of U.S. application Ser. No. 08/742,137, now U.S. Pat. No. 5,785,745, by Lauw et al, entitled "Amphiphilic Dyes," filed on Oct. 31, 1996, and assigned to the same assignee as the present invention.

FIELD OF INVENTION

The present invention relates to ink compositions employed in ink-jet printing and, more particularly, to improvement in waterfastness and the reduction of bleed of ink-jet prints employing said inks.

BACKGROUND OF INVENTION

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet printers offer low cost, high quality printing with relatively noise-free operation. As such, ink-jet printers have become a popular alternative to other types of printers. Notwithstanding their recent success, intensive research and development efforts continue toward improving waterfastness, optical density, print quality, and bleed alleviation of ink-jet images. In general, waterfastness, bleed performance, and optical density of ink-jet images still falls short of that produced by other technologies such as electrophotography or gravure printing. A continued demand in ink-jet printing has resulted in the need to develop reliable printers capable of producing high quality waterfast images at a reasonable cost.

However, few ink compositions are known that possess all the foregoing desired properties, since an improvement in one property often results in the degradation of another property. Thus, many inks commercially used represent a compromise in an attempt to achieve an ink evidencing at least an adequate response in each of the performance attributes, such as waterfastness and optical density.

DISCLOSURE OF INVENTION

An ink-jet ink composition for ink-jet printing and a method using the same is disclosed, the ink composition comprising an aqueous liquid vehicle, at least one zwitterionic surfactant; and at least one amphiphilic dye, said at least one amphiphilic dye comprising a plurality of amphiphilic dye molecules, each of said amphiphilic dye molecules consisting essentially of a chromophore and at least one hydrophobic arm attached thereto, said at least one amphiphilic dye being present in said ink-jet ink composition in an amount that is at least equal to its critical micelle concentration. The ink compositions of the present invention provide enhanced waterfastness and optical density.

DETAILED DESCRIPTION OF THE INVENTION

Figure 1A:
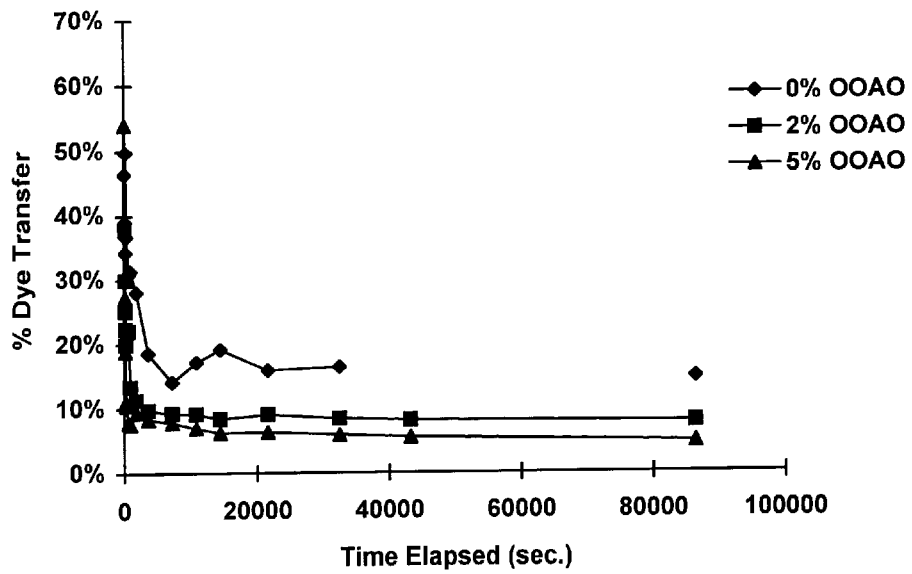
FIG. 1(a) is a plot of % dye transfer versus elapsed time, depicting the enhancement in waterfastness of the printed image using Reactive Black 5-pentylamine derivative and varying concentrations of OOAO.

The invention described herein is directed to ink-jet inks for printing ink-jet images using commercially available ink-jet printers such as DESKJET® printers, manufactured by Hewlett-Packard Company, of Palo Alto, Calif. The inks enable the production of high-quality printed images having excellent waterfastness, optical density, bleed alleviation, and print quality.

More specifically, the aqueous inks of the present invention comprise at least one water-soluble amphiphilic dye, at least one zwitterionic surfactant; and vehicle. The dye may be any dye having a chromophore and at least one hydrophobic arm attached thereto.

The amphiphilic dye is present at a concentration greater than the critical micelle concentration (cmc) for the dye; in accordance with U.S. Pat. No. 5,116,409, by Moffat, assigned to the same assignee as the present invention, and incorporated herein by reference; such that the micelles are formed that incorporate the dyes therein. Preferably the dye is present at a concentration of about 1.1 times its cmc.

The inks have a pKa greater than the pKa of the surfactant. Specifically, if the pH is excessive, the amphiphilic dye loses its waterfastness. If the pH is too low, the amphiphilic dye is insoluble in the ink vehicle. An organic buffer may be used to adjust the pH of the ink to appropriate levels.

All concentrations herein are in weight percent of total ink composition, unless otherwise indicated. The purity of all components is that employed in normal commercial practice for ink-jet inks.

Inks

Inks made according to the present invention comprise from about 0.01% to about 8% dye, preferably from about 2 to about 6, and most preferably, from about 3 to about 5 wt % dye; from about 0.01 to about 8 wt % surfactant, preferably from about 1 to about 6 , and most preferably, from about 3 to about 5 wt % surfactant.

The amphiphilic dye is present at a concentration greater than the critical micelle concentration (cmc) for the dye; in accordance with U.S. Pat. No. 5,116,409, by Moffat, described above; such that the micelles are formed that incorporate the dyes therein. Preferably the dye is present at a concentration of about 1.1 times its cmc. Furthermore, water is achieved where the average residence time of the amphiphilic dye in the micelle is proportionally longer that in its aqueous surrounding.

The inks have a pKa greater than the pKa of the surfactant. Specifically, if the pH is excessive, the amphiphilic dye loses its waterfastness. If the pH is too low, the amphiphilic dye is insoluble in the ink vehicle. An organic buffer may be used to adjust the pH of the ink to appropriate levels.

Dye

The dyes suitably employed in the practice of the invention are water-soluble amphiphilic dyes (dyes having hydrophilic and a hydrophobic components).

Water-soluble amphiphilic dyes, suitable in the present invention, include any dye having a chromophore and at least one hydrophobic arm attached thereto, the hydrophobic arm having from about 2 to about 30 carbon atoms, more preferably, from about 3 to about 15, and most preferably, from about 5 to about 12 carbon atoms. The amphiphilic dye may comprise a reactive dye covalently bonded to a hydrophobe. Alternatively, the amphiphilic dye may comprise a non-reactive dye (such as acid or basic dyes) having a hydrophobic arm attached thereto.

Reactive Dye

In general, the term "reactive dye" refers to a colored compound having reactive groups capable of covalently bonding with a substrate. Reactive dyes typically comprise a chromophore soluble in water, such as anthraquinone, a monoazo dye, or diazo dye, a phthalocyanine, an aza[18] annulene, a formazan copper complex, a triphenodioxazine, and the like, to which a reactive group is attached. In the practice of the invention, the reactive group has a leaving group X that may undergo nucleophilic displacement by a group in a hydrophobe, such as the hydroxyl group (—OH) of a long-chain alcohol. Thus, the nucleophilic displacement of a leaving group X of a reactive dye molecule with a group of a hydrophobe results in the attachment of the reactive dye to the hydrophobe by means of an ester, ether, amide, or like covalent linkage. It is contemplated that any reactive dye having a reactive group with a leaving group X may benefit from the practice of the invention.

Non-exclusive examples of reactive dyes include: sulphate esters of the hydroxyethylsulphones, (e.g. Remazol dyes available from Hoechst); dyes based on triazines, (mono, di, and tri chloro/fluoro triazines such as those available from ICI under the trade name Procion dyes); pyrimidine derivative dyes such as trichloropyrimidines and chlorofloropyrimidine (available from Sandoz); phosphonic acid reactive dyes such as Procion T dyes, e.g., RR177, RR179, and RV 35 all available from Zeneca; and quaternized nicolinic acid derivative dyes, such as Procion Blue H-EG available from Zeneca, and Kayacelon Reactive orange, available from Nippon Kayaku.

Non-exclusive examples of reactive groups in the reactive dye include:

1. Reactive group dichlorotriazine (a difuntional triazine) and momochlorotriazine (a monofunctional triazine) as commercially available from ICI under the trade designation Procion and Procion H, respectively:

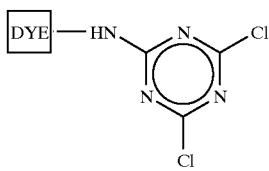

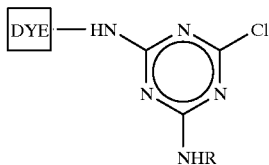

2. Reactive group 2-ethanesulfosulfonate, commercially available from Hoechst under the trade designation Remazol:

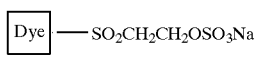

3. Reactive group trichlorotriazine, the reactive group in the commercially-available reactive dye structures known as Reacton and Drimaren, respectively available from Ciba-Giegy and Sandoz:

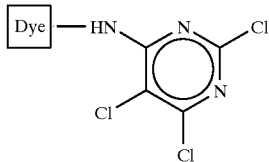

4. The following reactive groups are associated with reactive dye structures commercially known as Levafix E, Levafix P, and Levafix, each available from Bayer and having the following respective structures, respectively:

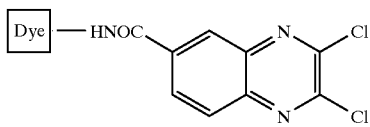

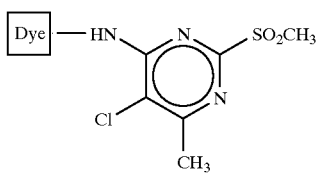

5. Another reactive group for a reactive dye (a difunctional diazine) that may be suitably employed in the practice of the invention has the following general which is commercially available under the trade designation Reactofil from Ciba-Geigy:

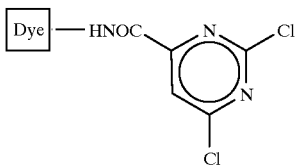

6. The following represents another suitably-employed reactive dye structure that is commercially available under the trade designation Primazin P from BASF:

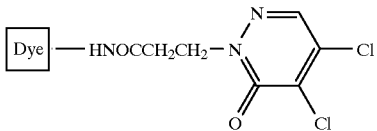

7. Additional examples of suitably-employed reactive dye structure commercially available from Fancolor and Cassella under the trade designations Elisiane and Solidazol, include:

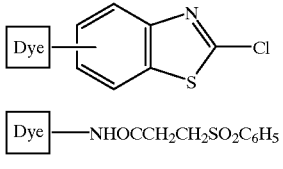

Non-Exclusive examples of commercially available reactive dyes that may be employed include, Reactive Black 31, Reactive Blue 7, Reactive Blue 19, Reactive Blue 27, Reactive Blue 38, Reactive Blue 71, Reactive Blue 77, Reactive Red 21, Reactive Red 49, Reactive Red 106, Reactive Red 180, Reactive Red 413, Projet Magenta-IT (commercially available from Zeneca and having proprietary composition), Reactive Yellow 37, Reactive Yellow 57, Brilliant Yellow VS 46LS, Intracon Yellow VS6R, Intracon Brilliant Yellow 6G-E, and Reactive Yellow 160.

Hydrophobe

A hydrophobe is defined as a compound having a hydrophobic, water insoluble organic tail. The hydrophobe employed in the practice of the invention may be any compound that is compatible with the other ink-jet ink components. Classes of suitable compounds include ionic amphiphiles (anionic and cationic) and pH-sensitive or insensitive zwitterionic and nonionic amphiphiles. Futhermore, fluorocarbon analogs of such hydrophobes may be suitably employed. Preferably, the hydrophobe is an amine or long chain alcohol with a chain length within the range of 5 to 10 carbon atoms, although the class of appropriate hydrophobes is very large, as evidenced by the large number of non-exclusive examples provided below.

Specific examples of anionic substituents for suitable hydrophobes include, but are not limited to, the following: carboxylate groups $(R-COO-)_n M^{n+}$; sulfocarboxylate groups $[(SO_3^-)-R-COO-M^{2+}]$; phosphonocarboxylate groups $[(H_{3-n}O_3PO-R-COO-M^{(n+1)}]$; sarcoside groups $(R-CON(CH_3)-CH_2COO-M^+)$; sulfate groups $(R-OSO_3-M^+)$; polyoxyethylene sulfate groups $(R-OCH_2CH_2)_n-OSO_3-M^+)$; sulfonate groups $(R-SO_3-M^+)$; polyoxyethylene sulfonate groups $(R-(OCH_2CH_2)_n-SO_3-M^+)$; and phosphate groups $(R-OPO_3H_{3-n}Mn+)$, where M represents the cationic species associated with the amphiphile. Alginates and bile salts may also be employed. Additional examples of hydrophobes include 1-hydroxy-2-sulfonate groups, benzene sulfonate groups, and naphthalene sulfonate groups, respectively represented by the following general formulas:

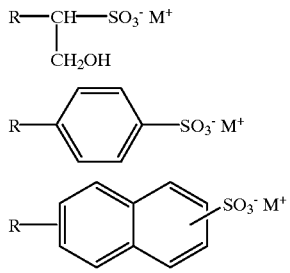

Other specific examples of hydrophobes include carboxylates such as sodium stearate and oleates.

Other hydrophobes can have the substituents depicted in, but are not limited to those in, Table 1 below. These represent the broad class of cationic amphiphiles useful in the practice of the invention.

TABLE 1

| Chemical Stucture | Name of Class |
|---|---|
| $R-\overset{R_1}{\underset{R_3}{N^+}}-R_2 X^-$ | ammonium |
| $R-\underset{R_2}{S^+}-R_1 X^-$ | sulfonium |
| $R-\overset{R_1}{\underset{R_3}{P^+}}-R_2 X^-$ | phosphonium |
| $R-N^+\text{(pyridine ring)} \quad X^-$ | pyridinium |
| $R-N^+\text{(isoquinoline)} \quad X^-$ | quinolinium |
| $R-N^+\text{(bipyridyl)}-N^+-R_1 \quad X^{-2}$ | violegen |

R = long hydrophobic tail
$R_1, R_2, R_3$ = hydrogen or short alkyl chain

Non-ionic substituents to the hydrophobe include the following classes of compounds, but are not limited thereto: water-soluble STARBURST dendrimers, which are branched polyethylene amines available from Polysciences, Inc., and the like; polyethers, which include such compounds as ethylene glycol n-butyl ether, diethylene glycol n-butyl ether, diethylene glycol n-hexyl ether, triethylene glycol n-butyl ether, and propylene glycol isobutyl ether; the TRITONS, such as TRITON X-100, which are nonyl phenyl polyethylene oxide surfactants available from Rohm & Haas Co.; the PLURONICS AND PLURFACS, which are polyethylene oxide and polypropylene oxide block co-polymers from BASF; the SURFYNOLS, which are acetylenic polyethylene oxide surfactants available from Air Products & Chemicals, Inc.; the TERGITOLS, which are alkyl polyethylene oxides available from Union Carbide; and BRIJ which are also alkyl polyethylene oxides available from ICI America.

SURFYNOL's are represented by the following general formula:

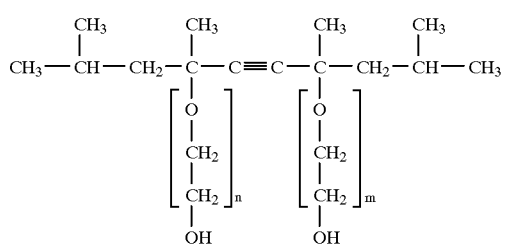

wherein n+m=0 to 50.

Additional classes of hydrophobic substituents are represented by the following general formulas in Table 2.

TABLE 2

| Chemical Structure | Name of Class |
|---|---|
| [R—(OCH$_2$CH$_2$)$_n$—OH] | polyoxyethylene alcohol |
| [R—(OCH$_2$CH$_2$CH$_2$)$_n$—OH] | polyoxypropylene alcohol |
| R—COO—(CH$_2$CH$_2$)$_n$—H | polyoxyethylene ester |
| R—COO—CH—CH$_2$OH<br>\|<br>OH | glycerol monoester |
| R—COO—CH$_2$CCH$_2$OH with CH$_2$OH groups | pentaerythritol monoester |
| R—COO—CH$_2$—CH(O)CH$_2$ ring with HO—HC, CH—OH, CH—OH | sorbitan monoester |
| R—(CH$_2$CH$_2$O)$_n$ | crown ether |
| R—S—R$_1$<br>↓<br>O | sulfoxide |
| R—S—(CH$_2$)$_n$—OH<br>↓<br>O | sulfinyl alkanol |
| R—S—(CH$_2$CH$_2$O)$_n$—H | polyoxyethylene thioether |

TABLE 2-continued

| Chemical Structure | Name of Class |
|---|---|
| R—N$^+$(R$_1$)(R$_2$)→O$^-$ | amine oxide |
| R—(CH$_2$CH$_2$NH)$_n$ | azacrown |
| R—P$^+$(R$_1$)(R$_2$)→O$^-$ | phosphine oxide |
| R—CONCH$_2$CHCHCHCH$_2$OH with CH$_3$, OH, OH, OH, OH groups | N-methylglucamine |

Zwitterionic substituents to the hydrobphobe may be used in the practice of the invention. Examples, include, but are not limited to, the following: N,N-dimethyl-N-dodecyl amine oxide (NDAO); N,-N-dimethyl-N-tetradecyl amine oxide (NTAO); N,N-dimethyl-N-hexadecyl amine oxide (NHAO); N,N-dimethyl-N-octadecyl amine oxide (NOAO); N,N-dimethyl-N-(Z-9-octadecenyl)-N-amine oxide (OOAO); amines (1°, 2°, and 3°), diamines, and morpholines. NDAO has a molecular weight of 229 based upon the following general formula:

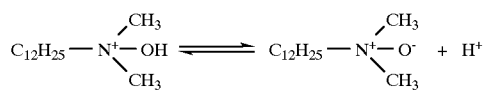

In place of the $C_{12}H_{25}$-moiety, any R moiety may be used. Thus, the general structures of NTAO (molecular weight= 257), NHAO (molecular weight=285), NOAO (molecular weight=313), and OOAO (molecular weight=311) may be derived using the above formula for NDAO.

Other examples include sulfobetaines, which have the following general formula:

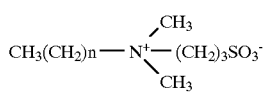

Where n=11, the compound is denoted SB3-12, and where n=15, the compound is denoted SB3-16.

Other examples include C betaine, N betaine, triglycine, N,N-dialkyl taurine, and phosphatidylcholine. Another example is N-Dodecyl-N,N-dimethyl glycine. Yet other examples include phosphate, phosphites, phosphonates, lecithins or the like, and phosphate esters such as phosgomyeline, give by the following general formula:

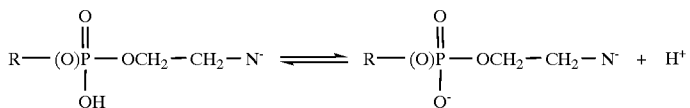

Other similar compounds include phosphoglycerides, such as phosphatidylethamines, phosphatidylcholines, phosphatidyl serines, phosphatidylinositols, and B'-O-lysylphosphatidylglycerols.

Other examples that may be employed in the practice of the invention aside from those mentioned above include Amphiphilic Dye Comprising Reactive Dye and Hydrophobe Examples of amphiphilic dyes comprising a reactive dye covalently bonded to a hydrophobe are provided below, with the reactive dye component being Reactive Orange 16, Reactive Blue 4, Reactive Red 4, and Reactive Black 5, respectively, and the hydrophobe component represented in each case as R:

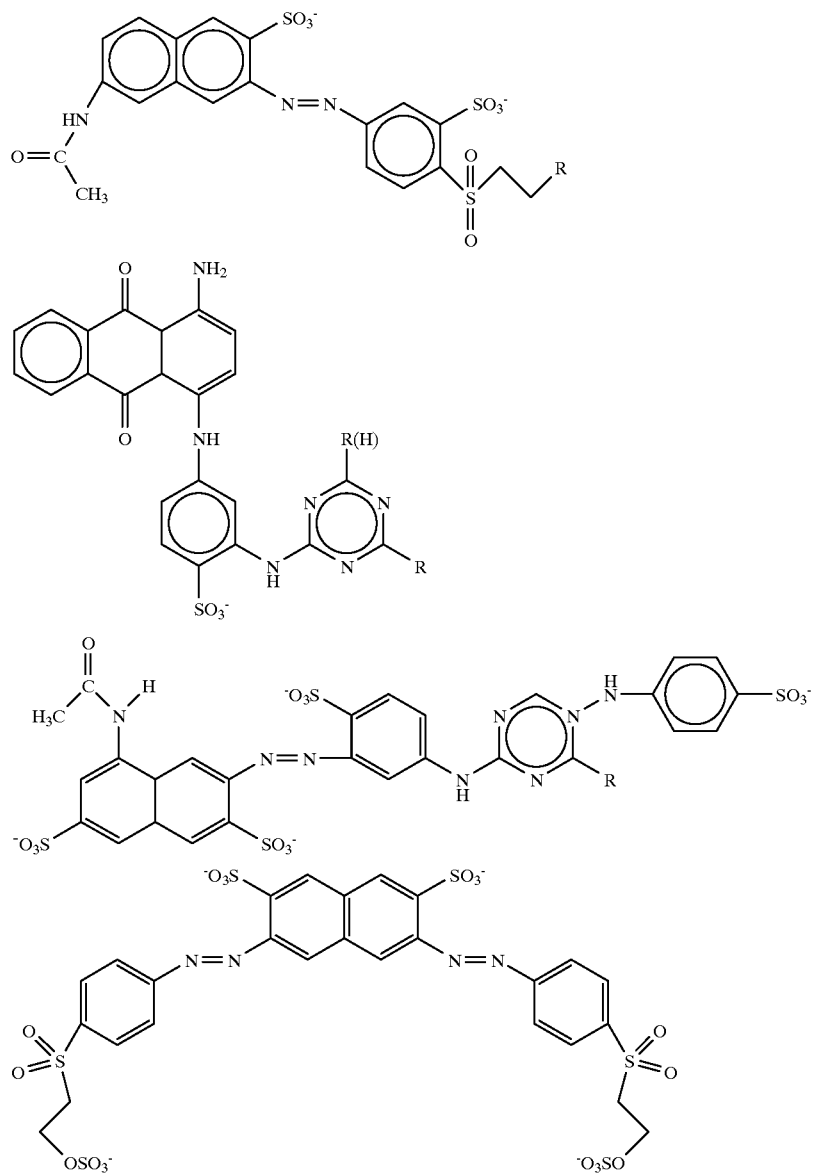

chelates, structures having twin tails, monochlorazines, and 2-ethanatosulfones.

In the above four amphiphilic dye structures, the hydrophobe group(s) may be selected from such substituents as depicted below (although not limited to these examples), where n is within the range of 1 to 20:

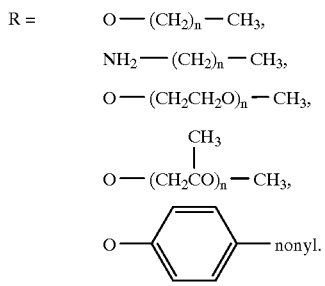

Amphiphilic Dye Comprising a Non-Reactive Dye Having a Hydrophobic Arm

As stated above, alternatively, the amphiphilic dye may comprise a non-reactive dye (such as acid or basic dyes) and having at least one hydrophobic arm attached thereto, the hydrophobic arm having from about 2 to about 30 carbon atoms, more preferably, from about 3 to about 15, and most preferably, from about 5 to about 12 carbon atoms. The hydrophobic arm may be straight chain, aryl, alkene, or any other water-insoluble functional group such as ethylene oxide. Such amphiphilic dyes may be synthesized using standard organic synthesis procedures. By way of example, the hydrophobic arm may be attached to a dye having a secondary amine group, a phenol or hydroxy group, or a sulphoamide group; or by transesterification of a carboxyl group on the dye.

Non-exclusive examples of amphiphilic dyes comprising an non-reactive dye having a hydrophobic arm attached thereto include, as represented below, Direct Yellow 19 with a $C_9$ hydrophobic arm, Solvent Red 49 with a $C_9$ hydrophobic arm, Acid Blue 249 with a $C_9$ hydrophobic arm, Acid Red 52 with two $C_8$ hydrophobic arms, and Acid Yellow 23 with a $C_9$ hydrophobic arm, respectively:

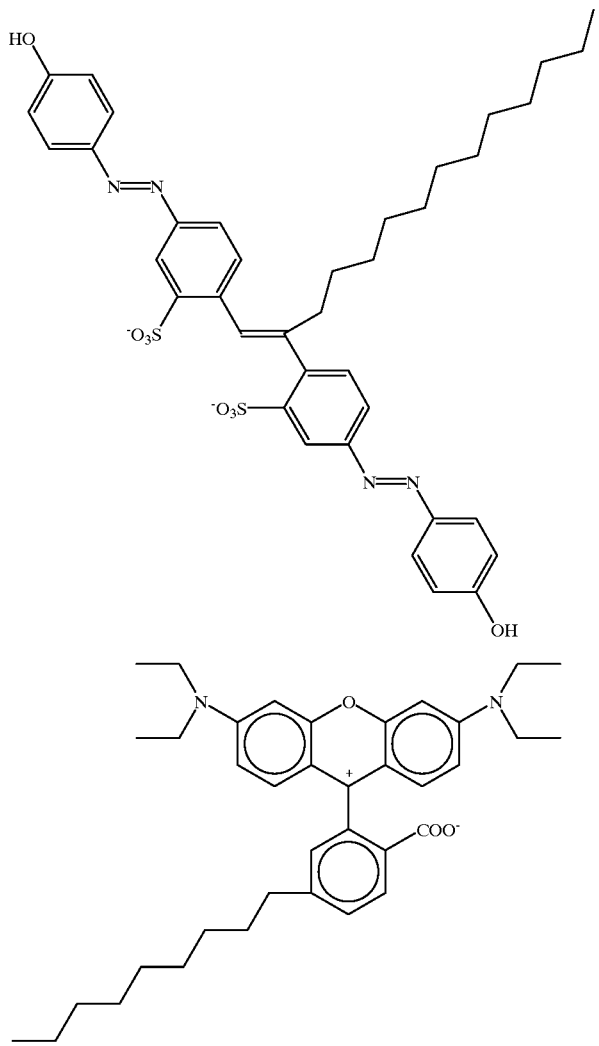

-continued

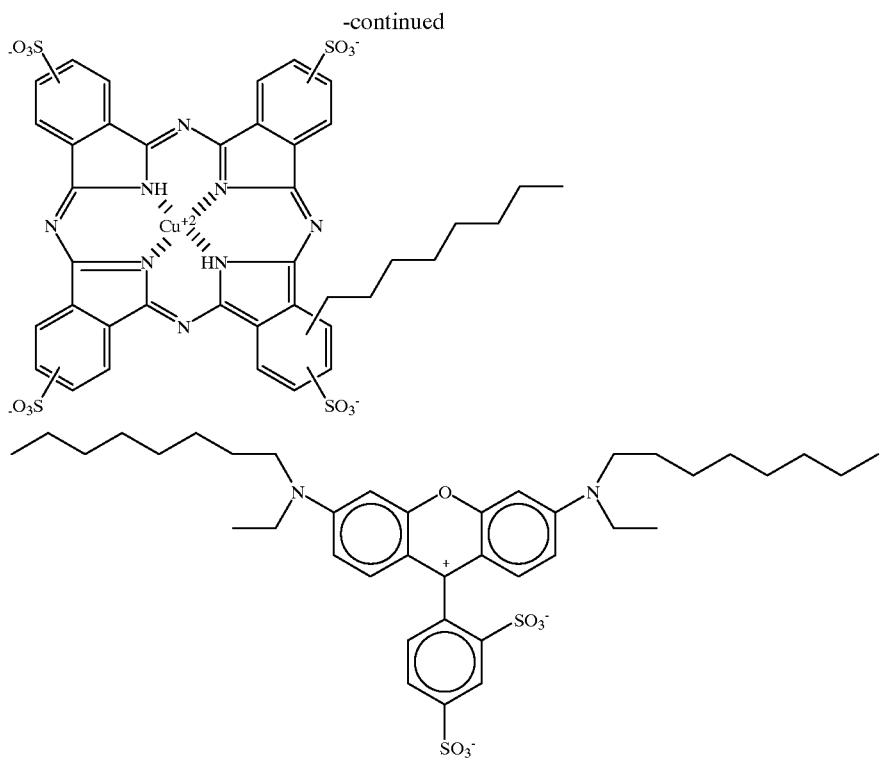

Surfactant

The surfactants suitably employed in the practice of the invention are pH sensitive zwitterionic (amphoteric) molecules (having the capacity of behaving either as an acid or a base). Preferred zwitterionic surfactants include amine oxides and phosphine oxides, preferably amine oxides, having the general structures below:

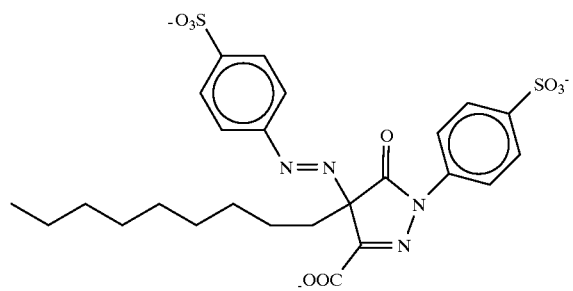

wherein $R_6$, $R_7$ and $R_8$ are independently selected from the group consisting of alkyls, alkenyls, and aryls.

Examples of pH sensitive zwitterionic surfactants include N,N-dimethyl-N-Octyl amine oxide (OTAO); N,N-dimethyl-N-dodecyl amine oxide (NDAO); N,-N-dimethyl-N-tetradecyl amine oxide (NTAO); N,N-dimethyl-N-hexadecyl amine oxide (NHAO); N,N-dimethyl-N-octadecyl amine oxide (NOAO); N,N-dimethyl-N-(Z-9-octadecenyl)-N-amine oxide (OOAO); with NDAO and OOAO being the preferred surfactants. For example, NDAO has a pKa in water of about 2.3:

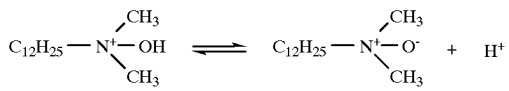

Buffers

Buffer are used, as necessary, to control the pH of the ink to above the pKa of the surfactant. Examples of preferably-employed organic buffers include Trizma Base, available from companies such as Aldrich Chemical (Milwaukee, Wis.), 4-morpholineethanesulfonic acid (MES), and 4-morpholinepropanesulfonic acid (MOPS).

Other Ingredients

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Other known additives such as viscosity modifiers and other acrylic or non-acrylic polymers may be added to improve various properties of the ink compositions as desired.

Vehicle

The amphiphilic dye and the zwitterionic surfactants and the other ingredients of the present invention are formulated with a liquid vehicle to form the present ink-jet ink compositions, with the liquid vehicle comprising water and water-soluble organic solvents. Examples of water-soluble organic solvents that may be employed include, but are not limited to, glycols such as ehtylene glycol, diethylene glycol, triethylene glycol, tetraehylene glycol, propylene glycol, polyethylene glycol, polypropylene glycol, and derivatives thereof; diols such as butanediol, pentanediol, hexanediol, and homologous diols; glycol esters such as propylene glycol laurate; mono- and di-glycol ethers such as cellosolves, including ethylene glycol monobutyl ether, diethylene glycol ether such as the carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, ketones, lactones such as γ-butyrolactone, lactams such as N-pyrrolidone and N-(2-hydroxyethyl)pyrrolidone, and glycerols and their derivatives.

EXAMPLES

Effect on Waterfastness

Two groups of aqueous ink-jet ink compositions were prepared, the inks in each group comprising 8% pyrrolidinone. One ink group further comprised about 6 wt % Reactive Black 5 -pentylamine derivative, while the other ink group further comprised about 3 wt % Reactive Yellow 37 -pentylamine derivative. The pH for each group of inks was maintained at 11.2 by addition of dimethylamine. Within each group of inks, inks with varying OOAO concentration were formulated.

Waterfastness performance for each ink was evaluated by printing samples on plain paper (such as Gilbert Bond available from Mead Company, and Champion Datacopy available from Champion International Inc.) using an ink-jet printer. The optical density, OD, of the printed samples were measured using a densitometer according to standard color measurement procedures. The printed samples were then held at an angle and known quantity of water was then clipped across a portion of the printed sample at predetermined time intervals. The optical density of the transferred dye on the unimaged portion of the paper was then measured. Percent transfer of colorant was then calculated according to Equation I:

$$\% \text{ dye transfer} = ((OD_{before\ water} - OD_{after\ water})/(OD_{before\ water}))*100 \qquad \text{EQUATION I}$$

Figure 1B:
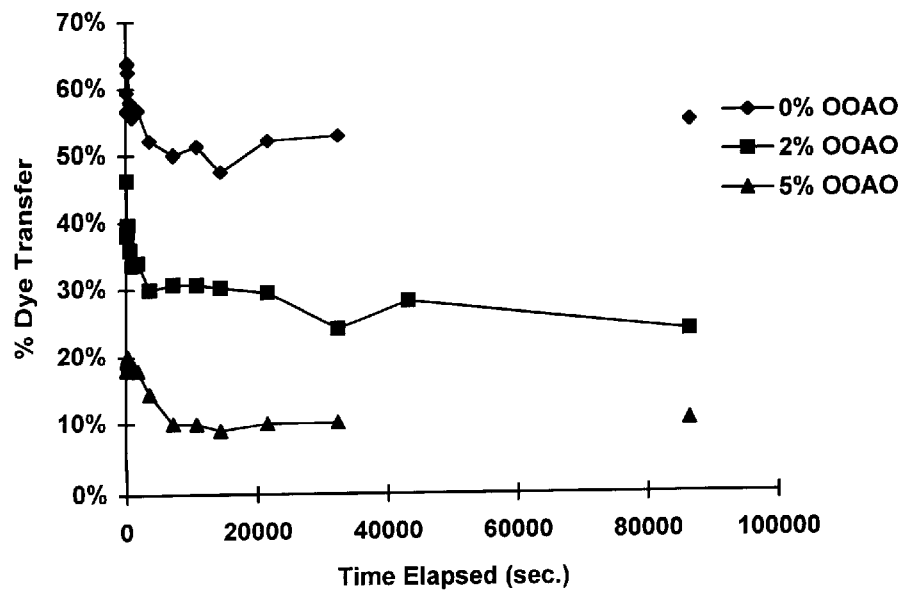
FIG. 1(b) is a plot of % dye transfer versus elapsed time, depicting the enhancement in waterfastness of the printed image using Reactive Yellow 35-pentylamine derivative and varying concentrations of OOAO.

The results of % dye transfer were plotted against time elapsed (time between initial printing and time when printed samples were dripped with water) for Reactive Black 5 - pentylamine derivative, and Reactive Yellow 37 - pentylamine derivative, and are reported in FIGS. 1(a) and 1(b), respectively. It is desired that the % dye transfer be minimized. As can be seen from the data in FIGS. 1(a) and 1(b) waterfastness of the printed images increased with increasing OOAO concentration.

Effect on Optical Density

Three groups of aqueous ink-jet inks were prepared, the inks in each group comprising 8% pyrrolidinone. One ink group further comprised 6 wt % Reactive Black 5 - pentylamine derivative, another ink group further comprised 3 wt % Reactive Yellow 37 - pentylamine derivative, and one group further comprised 3 wt % Reactive Blue 19 - pentylamine derivative. The pH for each group of inks was maintained at 11.2 by addition of dimethylamine. Within each group of inks, inks with varying OOAO concentration were formulated.

Figure 2:
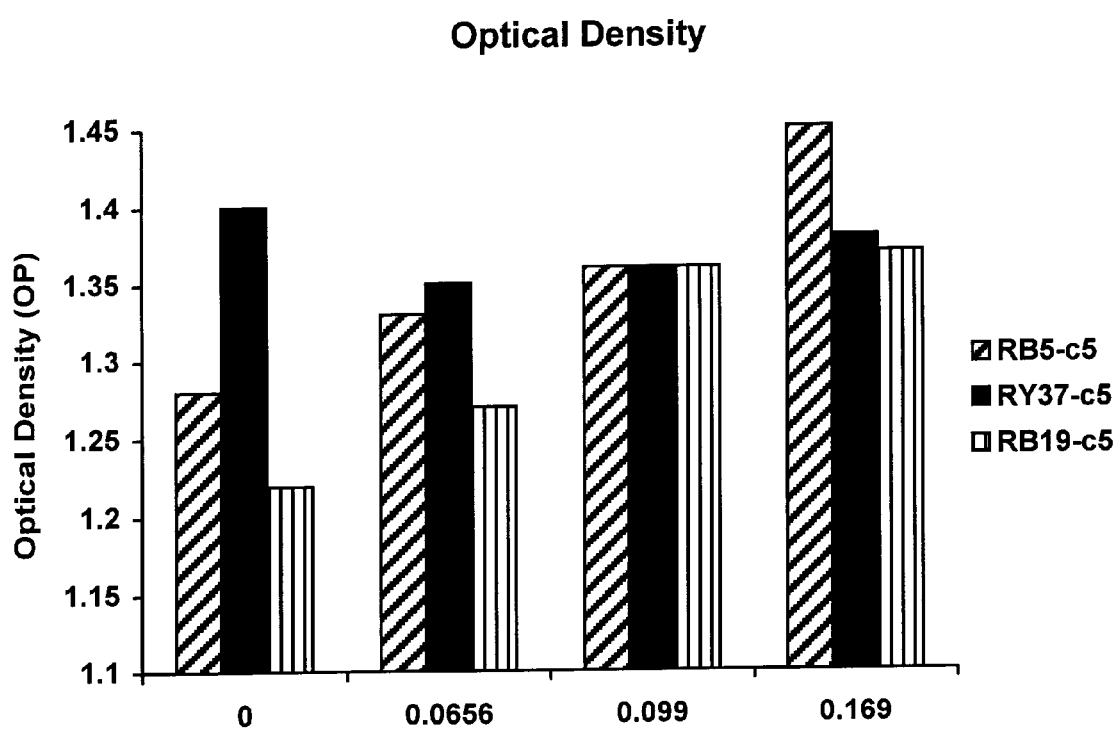
FIG. 2 is a plot of optical density versus concentrations of OOAO, depicting the enhancement in optical density of the printed image, as a result of the present invention.

Optical density performance for each ink was evaluated by printing samples on plain paper using an ink-jet printer. The optical density, OD, of the printed samples was measured using a densitometer according to standard color measurement procedures. The optical density results were plotted against OOAO concentration for each ink, and are reported in FIG. 2. It is desired that the optical density be maximized. As can be seen from the data in FIG. 2 optical density increased with increasing OOAO concentration. These results were unexpected since the addition of most surfactants causes optical density to decrease on plain paper.

Similar results were achieved with pentylamine derivatives of Reactive Red 180 and Reactive Blue 21. Similar results can be achieved with 4-alkyl anilinium derivatives of reactive dyes of the present invention and any other ammonium ion pH sensitive derivatives with hydrophobic moieties wherein the parent dye molecule is made more hydrophobic by the addition of an alkyl chain.

INDUSTRIAL APPLICABILITY

The present inks are expected to find commercial use in ink-jet printing.

What is claimed is:

1. An ink-jet ink composition for ink-jet printing comprising:
   an aqueous liquid vehicle;
   a zwitterionic surfactant; and
   at least one amphiphilic dye,
      said at least one amphiphilic dye comprising a plurality of amphiphilic dye molecules, each of said amphiphilic dye molecules consisting essentially of a chromophore and at least one hydrophobic arm attached thereto,
      said at least amphiphilic dye being present in said ink-jet ink composition in an amount that is at least equal to its critical micelle concentration.

2. The ink-jet ink composition of claim 1 wherein said at least one hydrophobic arm has from about 2 to about 30 carbon atoms.

3. The ink-jet ink composition of claim 2 wherein said at least one hydrophobic arm has from about 3 to about 15 carbon atoms.

4. The ink-jet ink composition of claim 3 wherein said at least one hydrophobic arm has from about 5 to about 12 carbon atoms.

5. The ink-jet ink composition of claim 1 wherein said at least one amphiphilic dye consists essentially of a reactive dye molecule covalently attached to a hydrophobe molecule.

6. The ink-jet ink composition of claim 5 wherein said hydrophobe molecule has a substituent selected from the group consisting of anionic amphiphiles, cationic amphiphiles, non-ionic amphiphiles, and zwitterionic amphiphiles.

7. The ink-jet ink composition of claim 6 wherein said cationic amphiphiles are selected from the group consisting of carboxylates, sulfocarboxylates, phosphonocarboxylates, sarcosides, sulfates, sulfonates, phosphates, aliginates, and bile salts.

8. The ink-jet composition of claim 6 wherein said anionic amphiphiles are selected from the group consisting of ammonium, sulfoniums, phosphoniums, pyridiniums, quinoliniums, and viologens.

9. The ink-jet composition of claim 6 wherein said non-ionic amphiphiles are selected from the group consisting of water-soluble polyethylene amines, polyethers, polyethylene oxides, acetylenic backboned polyethylene oxides, alcohols, esters, crown ethers, sulfoxides, sulfinyl alkanols, thioethers, amine oxides, azacrowns, phosphine oxides, and N-methylglucamines.

10. The ink-jet composition of claim 6 wherein said zwitterionic amphiphiles are selected from the group consisting of N,N-dimethyl-N-dodecyl amine oxide; N,-N-dimethyl-N-tetradecyl amine oxide; N,N-dimethyl-N-hexadecyl amine oxide; N,N-dimethyl-N-octadecyl amine oxide; N,N-dimethyl-N-(Z-9-octadecenyl)-N-amine oxide; amines, diamines, morpholines, N-dodecyl-N,N-dimethyl glycine, sulfobetaines, phosphates, phosphites, phosphonates, lecithins, phosphate esters, and phosphoglycerides.

11. The ink-jet composition of claim 5 wherein said hydrophobe molecule is selected from the group consisting of an amine and an alcohol, wherein said hydrophobe molecule has a carbon chain length from about 5 to about 12.

12. The ink-jet composition of claim 5 wherein said reactive dye molecule is a water-soluble dye selected from the group consisting of Reactive Black 5, Reactive Black 31, Reactive Blue 4, Reactive Blue 7, Reactive Blue 19, Reactive Blue 27, Reactive Blue 38, Reactive Blue 71, Reactive Blue 77, Reactive Red 4, Reactive Red 21, Reactive Red 49, Reactive Red 106, Reactive Red 180, Reactive Red 413, Reactive Yellow 37, Reactive Yellow 57, Reactive Yellow 160, and Reactive Orange 16.

13. The ink-jet composition of claim 1 wherein said at least one amphiphilic dye consists essentially of a non-reactive dye molecule having at least one hydrophobic arm attached thereto.

14. The ink-jet composition of claim 13 wherein said at least non-reactive dye is selected from the group consisting of Direct Yellow 19, Solvent Red 49, Acid Blue 249, Acid Red 52, and Acid Yellow 23.

15. The ink-jet composition of claim 1 wherein said at least one zwitterionic surfactant is a pH-sensitive amine oxide or phosphine oxide having the formula:

wherein $R_6$, $R_7$ and $R_8$ are independently selected from the group consisting of alkyls, alkenyls, and aryls.

16. The ink-jet composition of claim 15 wherein said amine oxide is selected from the group consisting of N,N-dimethyl-N-Octyl amine oxide; N,N-dimethyl-N-dodecyl amine oxide; N,-N-dimethyl-N-tetradecyl amine oxide; N,N-dimethyl-N-hexadecyl amine oxide; N,N-dimethyl-N-octadecyl amine oxide; and N,N-dimethyl-N-(Z-9-octadecenyl)-N-amine oxide.

17. The ink-jet composition of claim 15 wherein said at least one amphiphilic dye consists essentially of a reactive dye molecule covalently attached to a hydrophobe molecule.

18. The ink-jet composition of claim 15 wherein said at least one amphiphilic dye consists essentially of a non-reactive dye molecule having at least one hydrophobic arm attached thereto.

19. A method for improving waterfastness of an ink-jet image printed using an ink-jet printer, said method comprising the steps of:
   printing an ink on a print medium, said ink comprising:
      an aqueous liquid vehicle;
      a zwitterionic surfactant; and
      at least one amphiphilic dye,
         said at least one amphiphilic dye comprising a plurality of amphiphilic dye molecules, each of said amphiphilic dye molecules consisting essentially of a chromophore and at least one hydrophobic arm attached thereto,
         said at least amphiphilic dye being present in said ink-jet ink composition in an amount that is at least equal to its critical micelle concentration.

20. The ink-jet ink composition of claim 19 wherein said at least one hydrophobic arm has from about 2 to about 30 carbon atoms.

* * * * *

UNITED STATES PATENT AND TRADEMARK OFFICE
CERTIFICATE OF CORRECTION

PATENT NO. : 5,935,309
DATED : August 10, 1999
INVENTOR(S) : John R. Moffett et al.

It is certified that error appears in the above-identified patent and that said Letters Patent is hereby corrected as shown below:

Column 3, line 65 of the Patent, delete "momochlorotriazine", and insert therefore --monochlorotriazine--.

In Claim 7, delete "cationic", and insert therefore --anionic--.

In Claim 8, delete "anionic", and insert therefore --cationic--.

Signed and Sealed this

Twenty-second Day of August, 2000

Attest:

Q. TODD DICKINSON

*Attesting Officer*                *Director of Patents and Trademarks*